US006534105B2

(12) United States Patent
Kartchner

(10) Patent No.: US 6,534,105 B2
(45) Date of Patent: Mar. 18, 2003

(54) PROCESS FOR PREPARATION OF ANIMAL FEED FROM FOOD WASTE

(75) Inventor: Henry H. Kartchner, Tomball, TX (US)

(73) Assignee: Food Development Corporation, Houston, TX (US)

(*) Notice: Subject to any disclaimer, the term of this patent is extended or adjusted under 35 U.S.C. 154(b) by 73 days.

(21) Appl. No.: 09/797,513

(22) Filed: Mar. 1, 2001

(65) Prior Publication Data

US 2002/0122850 A1 Sep. 5, 2002

(51) Int. Cl.[7] .......... A23K 1/10; A23K 1/14; A23K 3/00; A23J 1/00

(52) U.S. Cl. .......... 426/241; 426/242; 426/465; 426/476; 426/807

(58) Field of Search .......... 426/241, 242, 426/465, 476, 807

(56) References Cited

U.S. PATENT DOCUMENTS

| | | | | | |
|---|---|---|---|---|---|
| 3,708,085 | A | | 1/1973 | Bumpas | 220/18 |
| 3,787,583 | A | * | 1/1974 | Hruby | 426/53 |
| 3,831,288 | A | * | 8/1974 | Stribling et al. | 34/1 |
| 3,870,798 | A | * | 3/1975 | Hruby | 426/53 |
| 3,904,768 | A | * | 9/1975 | Hruby | 426/53 |
| 3,971,306 | A | | 7/1976 | Wiese et al. | 426/285 |
| 4,018,650 | A | | 4/1977 | Busta et al. | 195/28 |
| 4,046,789 | A | | 9/1977 | Muller et al. | 260/412.8 |
| 4,132,638 | A | | 1/1979 | Carlsson | 210/7 |
| 4,172,034 | A | | 10/1979 | Carlsson et al. | 210/178 |
| 4,203,755 | A | * | 5/1980 | Ruckstuhl | 71/9 |
| 4,259,361 | A | | 3/1981 | Procter | 99/348 |
| 4,464,402 | A | * | 8/1984 | Aannon | 426/242 |
| 4,632,833 | A | * | 12/1986 | Aannon | 426/242 |
| 5,174,042 | A | | 12/1992 | Tomizawa et al. | 34/1 |
| 5,260,092 | A | * | 11/1993 | Aannon | 426/656 |
| 5,634,600 | A | | 6/1997 | Kubota et al. | 241/36 |
| 5,728,310 | A | * | 3/1998 | Ice et al. | 219/679 |
| 5,810,903 | A | | 9/1998 | Branconnier et al. | 71/9 |
| 5,980,824 | A | * | 11/1999 | Kartchner | 422/22 |
| 6,197,081 | B1 | * | 3/2001 | Scharidt | 71/1 |

FOREIGN PATENT DOCUMENTS

| | | | |
|---|---|---|---|
| GB | 2341307 | | 3/2000 |
| GB | 2341307 | A1 | 3/2000 |
| HU | 56250 | A1 | 8/1991 |
| JP | 2000041588 | A1 | 2/2000 |
| WO | WO 99 30571 | | 6/1999 |
| WO | WO 9930571 | A1 | 6/1999 |

OTHER PUBLICATIONS

Database WPI, Derwent Publications, Ltd., London, Section Ch, Week 200019, GB; Class D13, AN 1999–574328 (XP002205702) & JP 2000 041588 A (Oike Tekkosho KK), Feb. 15, 2000 abstract.

Database WPI, Derwent Publications, Ltd., London, GB; Class D13, An 1991–276284 (XP002205703) & HU 56 250 A (Hungaromix Agrarfejlesztoe KFT), Aug. 28, 1991 abstract.

* cited by examiner

*Primary Examiner*—Chhaya D. Sayala
(74) *Attorney, Agent, or Firm*—Jenkens & Gilchrist, P.C.

(57) ABSTRACT

A process for preparing a protein-rich animal feed from waste food is described, wherein the food is cooked with steam, minced, dried, sterilized with radio waves, and put in condition to serve as a feed for protein-producing animals for human consumption.

20 Claims, 1 Drawing Sheet

PROCESS FOR PREPARATION OF ANIMAL FEED FROM FOOD WASTE

PRIOR RELATED APPLICATION

Not applicable.

FEDERALLY SPONSORED RESEARCH STATEMENT

Not applicable.

REFERENCE TO MICROFICHE APPENDIX

Not applicable.

FIELD OF THE INVENTION

This invention relates to a viable commercial process for creating animal feed from the mass of waste food in the form of table scraps and spoilage thrown away by eating establishments such as cafeterias and restaurants and grocery stores and producers.

BACKGROUND OF THE INVENTION

More people eat commercially prepared food out of the home than ever before. This is true not only in the United States, but in other parts of the world as well. Not only are more people eating out, but they eat out more often. This phenomena creates an enormous amount of waste; i.e., food scraps, over-ripe food, spoilage and animal parts discarded during food preparation, for disposal in landfills or incinerators. There is very little that can be done to recover this enormous store of protein in this potential food source and, since it commonly has a high water content, it is of little value as a fuel. Concurrently, in many parts of the world where the scraps are created and the spoilage occurs, there is also a dearth of food for feeding food source animals such as cattle, poultry, goats, lambs, and swine. This is particularly true in countries having only a small amount of land which can be devoted to farming or grazing, but yet there exists a dense population with a desire for meat. The land that is available, is most commonly used to grow food crops rather than the relatively inefficient growth of meat and protein from cattle. Many of their diets consequently are bereft of an effective protein source simply because the creation of edible protein is normally land intensive, with the exception of catfish farming. But, catfish is not the same.

The instant invention provides a process for recovering the protein values from these food sources and creating a protein-rich animal feed which can be used to create the animal meat protein which is lacking in the diets of so many people. This is particularly true in parts of Southeastern Asia where there is virtually no land available to grow this feed source.

While feed for meat-producing animals such as cattle does require some amount of real estate, even when in its greatest concentration such as a feed lot, if the feed lot can be located relatively close to the population center, then the transportation for the food scraps and spoilage to provide the source of protein for an animal feed would be minimized as would the time in transit, and there would be essentially no transportation costs involved in moving the processed animal food to the animals themselves for feeding.

While the prior art processes involve treating food-type vegetable waste for many purposes, none clearly address this problem in a meaningful way. One such process is described in U.S. Pat. No. 5,810,903, for a thermophilic aerobic fermentation of organic waste, which could be construed to include table scraps. The process involves the steps of pulping with water and then fermenting the mixture with microbes followed by an oxygenation step to enhance the growth of the microorganisms in the fermentation batch. Another process involves the degradation of organic waste by adding enzymes to a thermophilic aerobic degradation slurry made up of not more that 15% solids of microbially degradable material in the method described in U.S. Pat. No. 4,132,638. There the product of the process is a fertilizer or soil improver material from many different kinds of organic wastes including putrifial organic waste from communal kitchens.

A process for recovering fats, sugars, proteins, and starch from waste bakery products is described in U.S. Pat. No. 4,046,789, which involves various chemical reaction steps for dissolving, leaching and separating the various components of biscuit ingredients. Protein is recovered from food waste by microbial action to produce an animal feed or food supplement as described in U.S. Pat. No. 4,018,650. Here a protein source and carbohydrate source are brought together and subjected to microbial fermenting organisms to produce the protein cell.

U.S. Pat. No. 5,174,042 describes a garbage disposal device which utilizes a microwave heater to heat the garbage contained in the claimed garbage receptacle. This microwave heating drives the water out of the garbage and makes it somewhat less of a mess for removal to the location for pickup by the garbage truck.

As can be seen by the foregoing examples, many treatments have been applied in connection with the disposal of various wastes, including food waste. None address the desirable result of converting putrid vegetables and other food waste to a protein-rich feed for animals. However, the process described hereinafter provides steps for easily and economically processing food scraps and other sources of protein in food waste for use as an animal food to assist in the improvement of the protein content of the diet of populations through the production of feed for meat producing livestock and poultry.

SUMMARY OF THE INVENTION

A grain feed for livestock and other animals would contain about 10 to 12% protein. It has been found that the practice of this process produces a protein feed having a protein content of from about 20% to 28% protein, usually about 25% and, therefore, one would consider that the product of the process of this invention is a protein-rich food product. Even if it only produced an animal feed having about the same protein content as a grain feed, it accomplishes the objectives of a protein-rich feed in that it replaces with an otherwise useless waste, a product having a significant value for the purpose. Thus, the valuable result of this process is realized.

The process of this invention for producing a protein-rich animal feed is carried out by gathering the food scraps, usually from a restaurant, cafeteria, food processing plant or the like, or other spoiled or over-ripe vegetables and fruit, and transporting it to the processing facility. During the preparation of meat or preparing food for storage, freezing, canning or the like, objects are boned, gutted, trimmed or discarded. These, too, can be treated in the practice of this invention. At the facility, the table scraps and other protein-containing food waste, even animal entrails and bones, are collected in a holding tank until enough material for several hours of processing of the food waste is present. The most efficient use of this process assumes that the in-flow of the food waste, including table scraps, is relatively frequent and voluminous in order to keep the facility in motion. The food wastes are fed in contact with super-heated steam of from 110° C. to about 160° C. under elevated pressure, preferably about two atmospheres, to cook the food waste and reduce the microbial content. This contrasts with prior processes which encourage the microbial activity with heat, aeration and enzyme addition to aerobically degrade the food waste. It is in the practice of this invention that the food waste is maintained, not degraded.

The food waste is then minced, preferably ground to reduce the particle size to 3 mm or less. The steam remains present with the food waste during this grinding process to assure uniform heating and cooking, and since the steam condenses it creates a pumpable fluid stream of minced food waste, which then enters a conduit for transfer from the chopping stage to the next processing step while providing a residence time of about 30 minutes in the presence of the steam for continued cooking. This time is adjustable depending upon the make up of food waste in the feed. Steam, of course, condenses during the step, and the food waste being processed gathers even more water. From the cooking transport conduit, the food waste is then separated from the water by physical means such as a centrifuge, belt press, or screw press. This removes most (usually 50% to 75%) of the water and creates a semi-dry mass of the cooked food waste which now goes to a hot air dryer to remove the rest of the water and dry the food mass. In one embodiment, this dryer includes an internal mixing process to tumble the contents as they go through the vessel. This dryer is followed by a microwave treating zone, which uses radio waves to evaporate the remaining water and kill pathogens in, and assure sterilization of, the food waste. Alternatively, a commercially available dryer, microwave oven could be used. This later embodiment is preferred. After the sterilization step, the food waste is in condition to be sized and packaged for use as an animal feed.

The water and steam used are processed to maximize the energy recovery and to create a waste stream of water which is environmentally benign. The process also becomes more attractive through the installation of a co-generation plant which produces the steam for use in the process as well as electric power. The fuel of combustion for the boiler can be natural gas, oil, a biogas, coal, or wood. Of course, if the food waste reclamation project is used in conjunction with an anaerobic digester for the production of methane, that would be suitable fuel to use in the co-generation plant. This digester may also serve as an anaerobic digester in the process for converting manure to animal feed as described in co-pending patent application Ser. No. 09/788,087 (Atty. Dkt. No. 47425.1), filed on even date herewith. dr

DETAILED DESCRIPTION OF THE INVENTION

Figure 1:
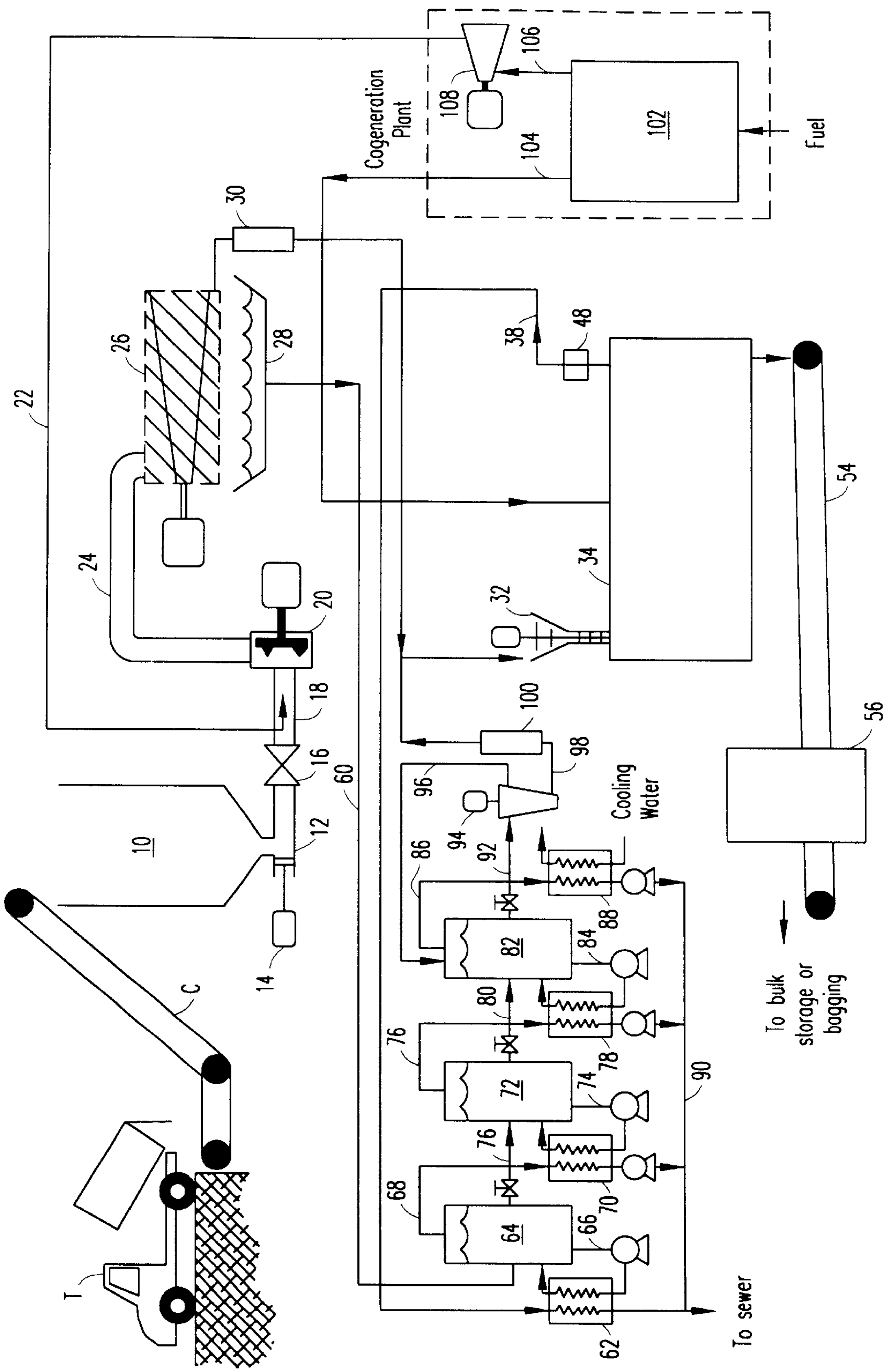
FIG. 1 is a schematic flow sheet showing the process of this invention.

This invention presents a practical and economic continuous process for the production of animal feed from food waste having origin in table scraps, overripe foods which were rejected in preparation stage, or overly bruised or damaged food. Discarded parts of vegetables, fruits and animals, even entrails, bones and chicken or turkey legs and heads, can be put through the process to provide food value as an animal feed. All of this, characterized as food waste, provides raw material for preparing quite useful food for animals and works well in the process of this invention. It should be remembered that glass, metals, or plastics should not be commingled with the food waste that is going to be processed. While some other fibrous material can be tolerated, it should be minimized due to the lack of food value in the material. It would be necessary to have an observation and screening procedure established to assure that none of this foreign matter finds its way into the processing system. Removing ferrous metals is relatively easy in that a magnetic separator can be used. Of course, screening the sources of the food waste to qualify it to supply only properly-separated materials could serve a purpose in maintaining the integrity of the product.

This process not only creates a desirable, protein rich product for feeding animals, but it also does so efficiently and effectively by harnessing the energy used in the process to achieve the greatest efficiency.

Turning to FIG. 1, a schematic drawing showing the process of this invention for sake of discussion. The food waste would arrive from a restaurant or other food processing source by truck T to be transferred to a conveyer C, either a belt or screw conveyor, to be placed in a holding tank 10, normally made of stainless steel, until a sufficient amount of food to be processed is collected to make a continuous run of at least several hours. It is assumed, however, that the furnishing of the food waste would be a continuous operation and if adjacent major population centers, this should be the case.

It is an advantage of the process of this invention that it may be operated either continuously around the clock or in a semicontinuous fashion as sufficient food waste is collected in the tank. Of course, there is a considerable loss in efficiency when it becomes necessary to shut down and start up the process. The tank 10 would be sized according to the overall capacity of the process equipment and flow of the food waste into the system, but should be initially stocked with food waste for a minimum of about five hours of processing time.

When the process is operating, the food waste in storage tank 10 moves through a conduit 12 under the power of a pump 14, preferable a positive displacement pump, through a valve 16, line 18 and into an in-line grinder 20. The grinder operates to mince the food waste to reduce the particle size of all of the food waste, including any bones or chicken legs present, preferably to a size of less than about 3 mm in diameter.

As the food moves through the conduit 18, it is joined by a stream of steam entering through line 22. The steam is preferably super heated at a temperature of from about 110° C. to about 160° C., preferably between about 120° C. to about 140° C. This steam would be charged to conduit 18 at an elevated pressure, preferably at about two atmospheres even though any convenient steam pressure or temperature available may be used, in order to begin the cooking process and help move the food scraps toward the grinder and to immediately somewhat reduce the microbial count in the food. Saturated steam may be used but may result in excessive water being mixed with the minced waste food and would require removal later in the process before drying. However, in some instances, it may even be desirable to add additional water to improve fluidity. Thus, as an energy-saving measure, super-heated steam is preferred with the steam condition being dependent upon what is most economically available. However, the temperatures and pressures set forth above are especially preferred since no special materials of construction are required to accommodate these operative conditions. The amount of steam to be fed into the waste food to cook it can be determined by a simple experiment or by thermodynamic calculation.

While the steam could be added after the grinder 20, it is preferable that it is added prior to the food waste entering the grinder 20 so that the grinder 20 may also assist in evenly distributing the steam through the food waste such that they are uniformly heated, cooking the entire mass. The food waste is now a semi-liquid, flowable mass of cooked, or partially cooked, waste food which exits the grinder 20 into conduit 24 which is of sufficient size and length to create residence time for the flowable mass while the cooking process continues, usually from about 15 to about 40 minutes, or preferably from about 25 minutes to about 35 minutes, in order to assure that the flowable mass of food waste is substantially cooked. Of course, during this time, the super-heated steam added into conduit 18 through line 22 has condensed and the mass of ground, cooked food is now somewhat of a slurry having a water content of from about 80% to about 85% by weight (from about 15 wt % to about 20 wt % of minced food waste). As stated, more water could be added if needed. The flowable mass of minced, cooked waste food exits conduit 24 to a solids-liquid separator 26 which, in some instances, could be a belt press or a centrifuge or preferably a screw-press, which removes from about 50% to about 75% of the water in the flowable mass to create a damp mass. The water removed is received in a collector pan 28 to leave a semi-dry or damp mass of food waste. The damp mass of food waste contains from about 10 wt % to about 35 wt % of water or condensed steam. Of course, less water is preferable since it reduces the amount of water which must be removed in a subsequent drying step. More water is possible, but introduces inefficiencies into the overall production of the food product by requiring additional cost to remove it from the product. The percentages set forth above are preferred with respect to the operation of the process of this invention. By damp mass, it is meant that the ground cooked food recovered from the solid-liquid separator 26 would feel slightly wet to the touch; much like the feel of a shirt or a pair of socks immediately removed from a home washing machine. The semi-dry or damp mass of solid food waste is moved from the liquid solid separator 26 onto a conveyor 30, preferably an auger or a belt, where it is carried to a hopper 32 and from there to a microwave/hot air dryer and microwave chamber 34. The damp mass of food solids move concurrently with hot gases, supplied as described later, through the dryer 34 with the water being evaporated from the food waste exiting the dryer as steam. The steam leaves dryer 34 through line 38 moved by a blower 48. The steam in line 38 continues for energy recovery which will be discussed thereinafter. In the meantime, the now dry, cooked solid food waste exits the dryer 34 through conduit 54 and thence to a cooler 56.

The microwave dryer supplies radio waves of a frequency of 915 MHz to 2450 MHz. One such device that can be particularly useful in the practice of this invention is described in U.S. Pat. No. 5,980,824, which is incorporated herein by reference for all purposes. Of course, there are other microwave devices available. It is preferred, however, that the drying and microwave sterilization of the damp mass be performed simultaneously in a continuous oven which feeds the damp mass into the oven on a belt and contacts it with hot gases such as hot air or combustion gases as well as microwave energy. Together, the hot air and microwave serve to dry the damp mass as well as kill the pathogens in the waste food as it is being dried to sterilize the food to prevent the transmission of food laden disease. Such combination driers can be obtained, for example, from Ferrite Company of Hudson, N.H. and are adaptable to many and varied throughput rates and capacities and power requirements. For example, it is especially preferred that the microwave power operate at about 80 kW at about 915 MHz frequency for a time sufficient to kill such pathogens in the waste food. The application of microwave energy and heat simultaneously are especially preferred in the practice of this invention since the microwave energy stimulates the water inside of a particle to evaporate while the external heat being applied in the oven causes additional evaporation and water from both sources may be removed as steam from the dryer-microwave combination. During the time that this is occurring, pathogens are being destroyed and by the time the water is removed to a desirable product content, the protein-rich animal food will also be sterilized.

Once the food waste, now ground, cooked and dried, exits the microwave dryer 34, it is bacteria-free and may then go to a facility for cooling and packaging. Of course, if the processing facility of this invention happens to be at a feed lot, then the feed may be conveyed directly to storage silos for feeding of the animals for which the material is intended. The amount of water content left in the high-protein animal feed product would depend largely upon its mode of selling, whether in powder, granules or pellets, and the use to which it will be ultimately put. If it is planned that the feed product will be pelletized for use, then the water content should remain from about 10 wt % to 12 wt % to aid in the cohesiveness of the pellet. If a powered or granular product is desired, then the water content could be less than about 10 wt %.

The steam in line 38 is routed through a heat exchanger 62 and the remaining water content is sent for processing. A preferred treatment is shown in FIG. 1 as a triple effect evaporator which is used to concentrate the dissolved solids from the water, which exits the liquid-solids separator 26 and is collected in pan 28. This water exits collector pan 28 through line 60 and proceeds to the concentration evaporation section. Of course, other known methods of concentration and recovery could be used, but since the water is heated from the cooking process, it is put to good use in the triple effect evaporator. The steam in line 38 enters a heat exchanger 62 where it helps to heat the contents of evaporation tank 64, which circulates through circulation lines 66, through the heat exchanger 62 and back into tank 64. The water evaporated from tank 64 exits through line 68 and into heat exchanger 70, which transfers its heat to the contents of tank 72 being circulated through lines 74 through heat exchanger 70 and back into tank 72. The contents of tank 64 is transferred to tank 72 in line 76. This is repeated in the third effect where the evaporated water leaves tank 72 in line 76, to heat exchanger 78 with the contents of tank 72 exiting in line 80, and going into the third stage tank 82. The heat exchanger 78 transfers the heat from the hot water in line 76 to the contents of tank 82 in line 86 is condensed in heat exchanger 88 by the circulation of cooling water through heat exchanger 88.

The condensate from heat exchangers 62, 70, 78 and 88 is collected in line 90 and transferred to the water processing facility as clean environmentally-benign water. The triple effect evaporators are preferably operated at the following conditions: tank 64 is operated at a temperature of 81° C. and a pressure of 0.49 atm; tank 72 at 61° C. and 0.21 atm; and tank 82 at 42° C. and 0.082 atm. It would be well understood by those skilled in the art that other operating conditions may be adopted to achieve the same, or equivalent, effect and that these preferred conditions are offered by way of example and not by way of limitation. Parameters such as the quantity and condition of the steam exiting the dryer could affect the adjustment of the evaporation tanks. Since the material being treated, food waste, is inherently of variable quality and wetness, such adjustments must often be made to achieve the most efficient operation. However, even operating in less than the most efficient way, the advantages of this invention of providing a feed for protein producing animals for human consumption has considerable benefit.

The liquid in the final tank of the triple effect evaporator, tank 82, contains precipitated solids which have useful food value. This slurry will exit tank 82 through line 92 to a centrifuge 94, where the liquids and solids are separated with the liquids exiting the centrifuge 94 in line 96, where it is returned to evaporator tank 82. The solids exit centrifuge 94 through line 98 and are conveyed by conveyor 100 to hopper 32 of dryer 34 to be blended with the damp mass of food waste from the liquid-solid separator 26.

The utilities for the operation of the process are preferably provided by an on-site boiler 102, which produces steam exiting in line 106. The steam exiting boiler 102 in line 106 passes through a turbine/generator 108, and exits through 108 in line 22, where it is fed into conduit 18 to begin the cooking process of the food waste. Electrical requirements may be generated by a turbine/generator 108. Hot gases, such as combustion gases from the boiler 102, are passed through line 104 to the microwave/hot air dryer 34. If additional hot gases re required, methane or natural gas burners may be used to add the hot combustion gases or hot air needed. If additional hot air is required, heat from the turbine generator 108 could be routed to microwave/hot air dryer 34. Hot air from a heat exchanger using the combustion gases from the boiler 102 could be used if particulate matter from combustion is a concern.

course, if the facility is adjacent a source of steam and electricity for operating pumps and motors driving various pieces of equipment in the process, then it may be advantageous to purchase steam and electricity rather than provide the boiler. One other alternative is to generate the fuel, or biogas, with an anaerobic digester, which digests either some of the food waste or manure from the animals being fed, or both. It would depend upon the economics and the availability of a suitable fuel for a boiler. Of course, boilers are available which burn coal, oil, natural gas, or virtually any combustible fuel, even refuse.

The foregoing description has been offered for purposes of exemplification of the instant invention and many of the specific operations can be performed by common alternative equipment readily available and well-known to the skilled engineer. Accordingly, many of these variations and alternatives may be adopted without departing from the scope of this invention as claimed hereinafter.

We claim:

1. A process for preparing protein-rich animal feed from disposable food waste comprising the steps of:

mincing the food waste while cooking such waste with steam to make a flowable mass of cooked waste food and water from the condensed steam;

separating the cooked waste food from the water to recover a damp mass of food waste;

drying the damp mass of food waste with a hot gas stream; and sterilizing the food waste by exposing the food waste to microwave energy to kill pathogens in the food waste whereby a protein-rich animal feed is available.

2. The process of claim 1 wherein the drying and sterilizing steps are performed simultaneously.

3. The process of claim 1 wherein the cooking step is performed using super-heated steam.

4. The process of claim 3 wherein the superheated steam is at a temperature of from about 110° C. to about 160° C. when brought into contact with the food waste.

5. A process for preparing protein-rich animal feed from disposable food waste comprising the steps of:

collecting such food waste from various sources and place in a holding tank;

heating the food with steam to at least partially cook the food waste while condensing at least part of the steam;

grinding the food, in the presence of the steam, to a size of less than about 3 mm in average diameter while cooking the food to create a flowable mass containing the water from condensed steam;

dewatering the flowable mass to recover a damp mass of food waste;

drying the food waste by passing a stream of hot gasses through a vessel through which the food mass is passing;

sterilizing the solid food mass by exposing said food mass to radio waves for a time sufficient to kill microbial contamination of the food mass; and preparing the sterilized dry solid food mass for use as animal feed.

6. The process of claim 5 wherein the cooking step is performed using super-heated steam.

7. The process of claim 5 wherein the superheated steam is at a temperature of from about 110° C. to about 160° C. when brought into contact with the food waste.

8. The process of claim 5 wherein the drying and sterilizing steps are performed simultaneously.

9. A process for preparing protein-rich animal feed from disposable food waste comprising the steps of:

mincing the food waste to a size of less than about 3 mm while cooking such waste with superheated steam at a temperature of from about 110° C. to make a flowable mass of cooked waste food and water from the condensed steam;

separating the cooked waste food from the water to recover a damp mass of food waste having a water content of from about 10 wt % to about 35 wt %;

drying the damp mass of food waste with a hot gas stream; and sterilizing the food waste by exposing the food waste to microwave energy at a frequency of from about 915 MHz to about 2450 MHz to kill pathogens in the food waste whereby a protein-rich animal feed having a water content of from about 10 wt % to about 12 wt % is available.

10. A process for preparing protein-rich animal feed from disposable food waste comprising the steps of:

collecting such food waste from various sources and place in a holding tank;

heating the food with superheated steam at a temperature of from about 120° C. to about 140° C. to at least partially cook the food waste while condensing at least part of the steam;

grinding the food, in the presence of the steam, to a size of less than about 3 mm in average diameter while cooking the food to create a flowable mass containing from about 80 wt % to about 85 wt % water;

dewatering the flowable mass to recover a damp mass of food waste having a water content of from about 10 wt % to about 35 wt %;

drying the food waste by passing a stream of hot gasses through a vessel through which the food mass is passing;

sterilizing the solid food mass by exposing said food mass to radio waves for a time sufficient to kill microbial contamination of the food mass; and preparing the sterilized dry solid food mass for use as animal feed.

11. A process for preparing protein-rich animal feed from disposable food waste comprising the steps of:

mincing the food waste while cooking such waste with steam to make a flowable mass of cooked waste food and water from the condensed steam;

separating the cooked waste food from the water to recover a damp mass of food waste;

drying the damp mass of food waste with a hot gas stream; and sterilizing the food waste by exposing the food waste simultaneously to convectional heat and microwave energy to kill pathogens in the food waste whereby a protein-rich animal feed is available.

12. The process of claim 11 wherein the drying and sterilizing steps are performed simultaneously.

13. The process of claim 11 wherein the cooking step is performed using super-heated steam.

14. The process of claim 13 wherein the superheated steam is at a temperature of from about 110° C. to about 160° C. when brought into contact with the food waste.

15. A process for preparing protein-rich animal feed from disposable food waste such as table scraps, food parts discarded during a meal preparation, and over-ripe produce, comprising the steps of:

collecting such food waste from various sources and place in a holding tank;

heating the food with steam to at least partially cook the food waste while condensing at least part of the steam;

grinding the food, in the presence of the steam, to a size of less than about 3 mm in average diameter while cooking the food to create a flowable mass containing the water from condensed steam;

dewatering the flowable mass to recover a damp mass of food waste;

drying the food waste by passing a stream of hot gasses through a vessel through which the food mass is passing;

sterilizing the solid food mass by exposing said food mass simultaneously to convectional heat and radio waves for a time sufficient to kill microbial contamination of the food mass; and preparing the sterilized dry solid food mass for use as animal feed.

16. The process of claim 15 wherein the cooking step is performed using super-heated steam.

17. The process of claim 15 wherein the superheated steam is at a temperature of from about 110° C. to about 160° C. when brought into contact with the food waste.

18. The process of claim 15 wherein the drying and sterilizing steps are performed simultaneously.

19. A process for preparing protein-rich animal feed from disposable food waste such as table scraps, food parts discarded during a meal preparation, and over-ripe produce, comprising the steps of:

mincing the food waste to a size of less than about 3 mm while cooking such waste with superheated steam at a temperature of from about 110° C. to make a flowable mass of cooked waste food and water from the condensed steam;

separating the cooked waste food from the water to recover a damp mass of food waste having a water content of from about 10 wt % to about 35 wt %;

drying the damp mass of food waste with a hot gas stream; and sterilizing the food waste by exposing the food waste simultaneously to convectional heat and microwave energy at a frequency of from about 915 MHz to about 2450 MHz to kill pathogens in the food waste whereby a protein-rich animal feed having a water content of from about 10 wt % to about 12 wt % is available.

20. A process for preparing protein-rich animal feed from disposable food waste such as table scraps, food parts discarded during a meal preparation, and over-ripe produce, comprising the steps of:

collecting such food waste from various sources and place in a holding tank;

heating the food with superheated steam at a temperature of from about 120° C. to about 140° C. to at least partially cook the food waste while condensing at least part of the steam;

grinding the food, in the presence of the steam, to a size of less than about 3 mm in average diameter while cooking the food to create a flowable mass containing from about 80 wt % to about 85 wt % water;

dewatering the flowable mass to recover a damp mass of food waste having a water content of from about 10 wt % to about 35 wt %;

drying the food waste by passing a stream of hot gasses through a vessel through which the food mass is passing;

sterilizing the solid food mass by exposing said food mass simultaneously to convectional heat and radio waves for a time sufficient to kill microbial contamination of the food mass; and preparing the sterilized dry solid food mass for use as animal feed.

* * * * *